Sept. 12, 1967     H. H. ADAMS, JR., ET AL     3,341,129
ROCKET NOZZLE
Filed July 13, 1964     3 Sheets-Sheet 1
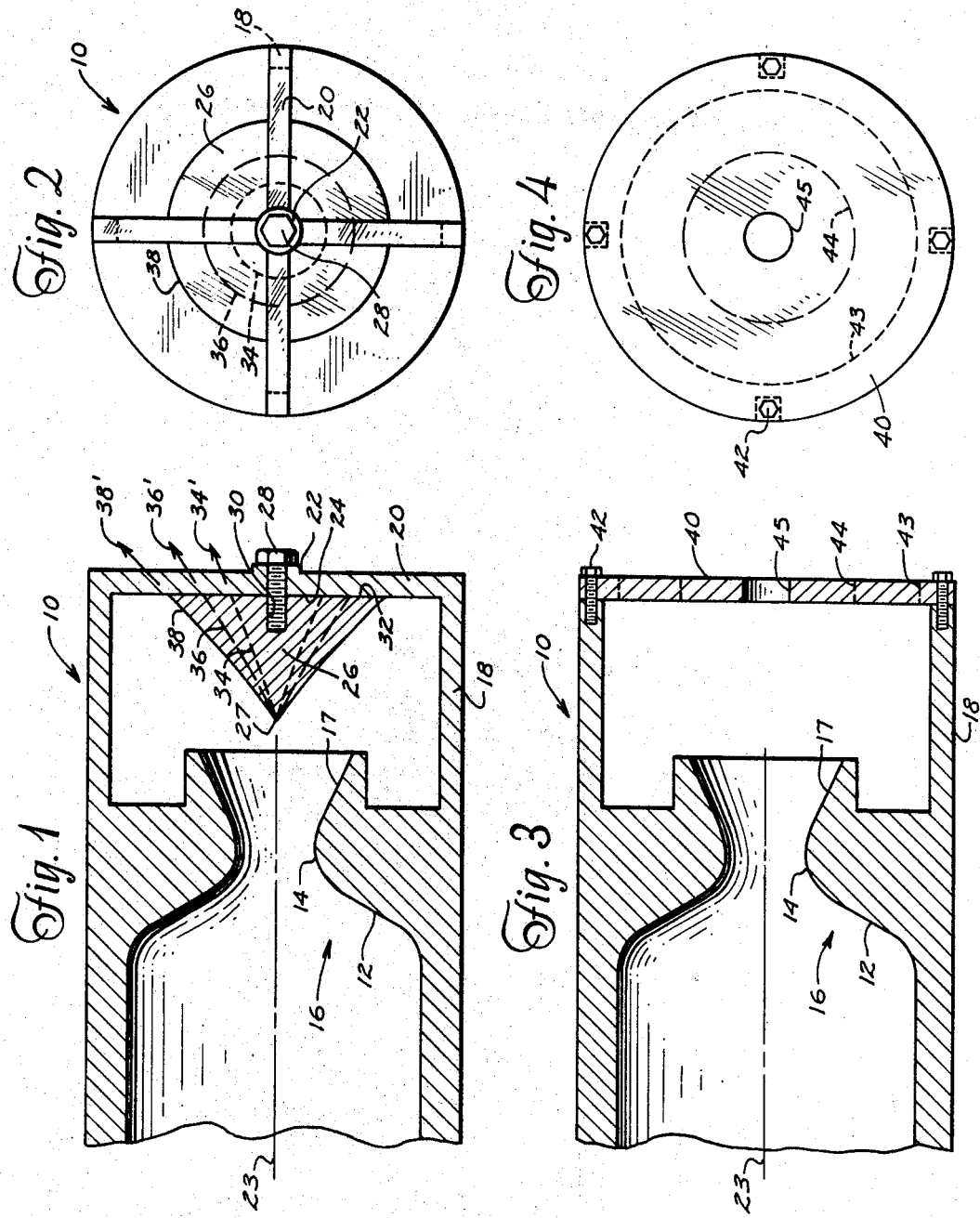
INVENTORS
HENRY H. ADAMS, JR.
PHILIP D. FISHER
BY Lawrence R. Hefter
ATTORNEY Sept. 12, 1967  H. H. ADAMS, JR., ET AL  3,341,129
ROCKET NOZZLE
Filed July 13, 1964  3 Sheets-Sheet 2

INVENTORS
HENRY H. ADAMS, JR.
PHILIP D. FISHER
BY Lawrence R. Hefter
ATTORNEY

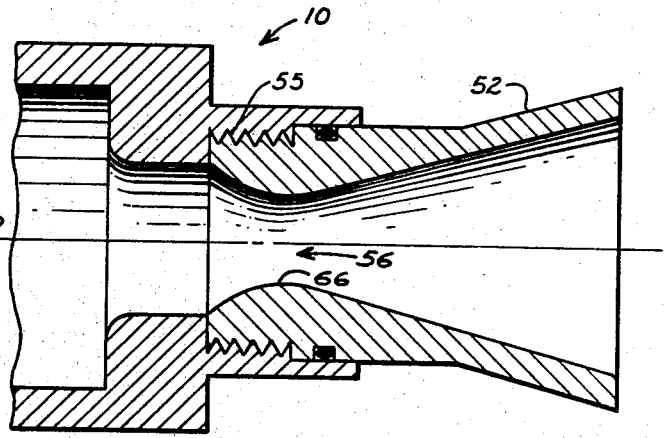
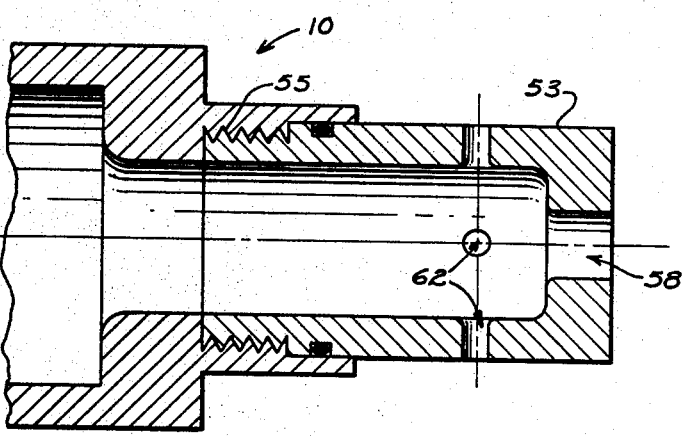
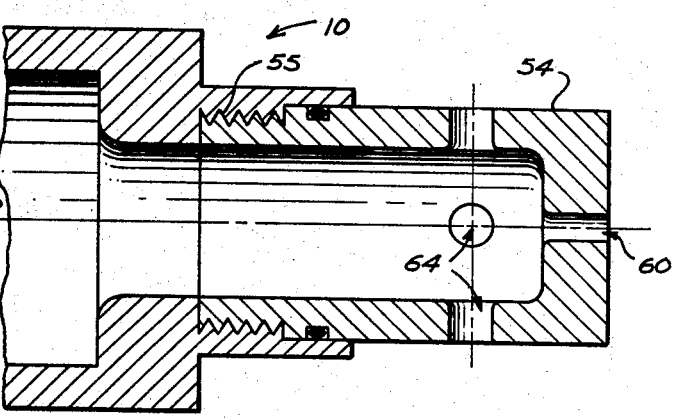

United States Patent Office 3,341,129
Patented Sept. 12, 1967

3,341,129
ROCKET NOZZLE
Henry H. Adams, Jr., Washington, D.C., and Philip D. Fisher, Fairfax, Va., assignors to Atlantic Research Corporation, Fairfax County, Va., a corporation of Virginia
Filed July 13, 1964, Ser. No. 392,061
7 Claims. (Cl. 239—265.11)

This application is a continuation-in-part of application Ser. No. 375,569, filed June 16, 1964, and now abandoned.

This invention relates to rocket motor exhaust nozzles and, more particularly, to interchangeable nozzle portions which provide pre-flight rocket motor thrust determination.

In various scientific and military rocket applications it is often desirable to have the capability of being able to vary the axial thrust level of a rocket motor either manually prior to launch or remotely prior to launch and/or during flight. This capability provides maximum efficiency in permitting the manufacture and storage of a single type of rocket motor having fixed combustion chamber operating characteristics and various flight performance characteristics which can be selected by merely changing a portion of the rocket nozzle. Furthermore, the use of a single rocket motor offers maximum reliability, predictability and reproducibility since the basic propulsion unit is a constant parameter and the only variation needed to achieve different thrust levels is a minor mechanical modification of a portion of the rocket nozzle. For simplicity in structure and operation and for minimization of expense and weight, it is preferable to use a manually controlled variable thrust rocket nozzle.

Many prior art variable thrust rocket motors operate on the principle of varying the thrust by varying the exhaust port areas. The effect of such a variation is transmitted upstream from the nozzle into the combustion chamber in the form of a pressure variation. The burning time and operating characteristics of solid and semi-solid propellants vary with the combustion chamber pressure and, in order to maintain constant burning characteristics, the combustion chamber pressure must remain constant. It is desirable to maintain the propellant burning characteristics constant as this provides performance reproducibility and reliability. In liquid propellant rockets the fuel pumping pressure is, in part, dependent upon the combustion chamber pressure and if this pressure remains constant the fuel-feed system design and operations are considerably simplified. Therefore, with these considerations in mind, the prior art variable area exhaust nozzles are often undesirable.

Other variable thrust nozzles employ movable vanes or deflectors to vary the direction of exhaust gas flow. These often require expensive, complicated and weighty systems to mount and position the vanes or deflectors properly.

Accordingly, it is one object of the present invention to provide a rocket nozzle which varies the axial thrust without affecting the rocket motor combustion chamber pressure.

Another object of the present invention is to provide a rocket nozzle which is easily and inexpensively adjusted to preset the desired flight performance of a rocket motor.

A further object of this invention is to provide a rocket nozzle which is capable of manual in situ adjustment for presetting the desired flight performance of a rocket motor.

A still further object of the present invention is to provide a rocket nozzle which is inexpensive to manufacture, which includes no moving parts, which is essentially maintenance free and which permits presetting the desired flight performance of a rocket motor.

Further objects and attendant advantages will be better understood from the following description.

Briefly stated, the present invention in one form comprises a set of rocket motor exhaust nozzles or nozzle portions, each of which has a given axial thrust level which is different from the axial thrust level of each of the other nozzles or portions of the set. In spite of the various axial thrust levels the burning conditions upstream of the exhaust nozzle throat are constant for the entire set. To achieve this variation in axial thrust level without affecting the propellant burning performance, the total effective exhaust area of each nozzle must be equal to a fixed value. It should be noted that the expression "effective exhaust area" or its equivalent as used above and throughout this specification refers to the actual cross-sectional exhaust or throat area modified by design efficiency considerations, such as the nozzle discharge coefficient.

In one embodiment of the present invention the set of exhaust nozzles includes a plurality of interchangeable conical members removably mounted downstream and spaced from the throat portion of a rocket motor exhaust nozzle with the apex of the conical portion facing toward and being coaxial with the nozzle throat. The side of each of the conical portions has a particular slope which is designed to cause the exhaust gases to take a particular flow path, the flow path resulting from each of the conical portions being slightly different. The flow paths will be predetermined to provide a series of successively decreasing axial thrust components thereby providing a series of interchangeable nozzle portions having successively decreasing axial thrust levels. The particular thrust level desired during a given flight is achieved by merely selecting the proper conical member and assembling it on mounting means formed as part of the exhaust end part of the rocket motor.

Another embodiment of this invention comprises a plurality of interchangeable nozzle portions each of which has a different rearwardly directed exhaust port cross-sectional area and all but one of which include a plurality of laterally directed equally circumferentially spaced exhaust ports. The sum total of the effective exhaust areas for each nozzle portion is equal to a fixed value, albeit the rearwardly directed exhaust port of each portion is different. Such a plurality of nozzle portions effects various predetermined axial thrust levels without affecting the rocket motor combustion chamber pressure. The particular desired flight performance is achieved by merely selecting the proper nozzle portion and mounting it on the exhaust end of the rocket motor.

While the specification concludes with claims particularly pointing out and distinctly claiming the subject matter which is regarded as the invention, it is believed that the invention will become better understood from the following description taken in combination with the accompanying drawings in which;

FIGURE 1 is a sectional view of a rocket nozzle employing a first embodiment of this invention;

FIGURE 2 is an end view of the rocket nozzle illustrated in FIGURE 1;

FIGURE 3 is a sectional view of a rocket nozzle employing a second embodiment of the present invention;

FIGURE 4 is an end view of the rocket nozzle illustrated in FIGURE 3.

Figure 6:
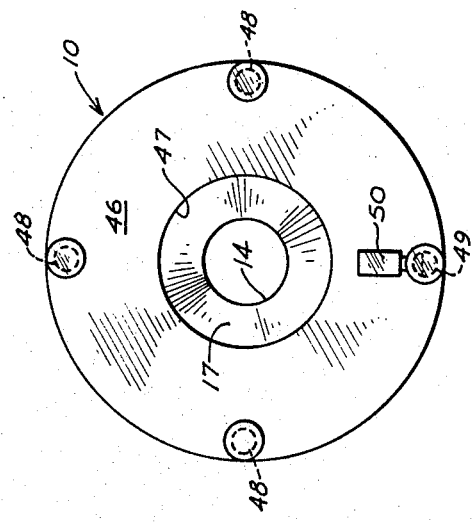
FIGURE 6 is an end view of the rocket nozzle illustrated in FIGURE 5.

FIGURE 7, FIGURE 8, and FIGURE 9 are sectional views of rocket nozzles which comprise a set of rocket nozzles formed in accordance with a third embodiment of the present invention.

In order to vary the axial thrust level of a given rocket motor without varying the combustion chamber pressure it is mandatory that the pressure conditions at the throat of the rocket motor converging-diverging exhaust nozzle remain constant. One way of achieving this is to provide a fixed converging throat section of an exhaust nozzle on the exhaust end of a rocket motor and to vary the axial thrust level by controlling the direction of flow of the expanding exhaust gases emanating from the throat portion of the nozzle. This method is employed in the first embodiment of this invention illustrated in FIGURES 1 and 2 where the rocket motor is shown generally at 10. Formed as part of the rocket motor or fixedly mounted on the exhaust end of the rocket motor is the converging section 12 and throat section 14 of an exhaust nozzle 16 as well as the initial stage 17 of the diverging portion of the exhaust nozzle 16. Extending axially or rearwardly from the exhaust end of the rocket motor 10 is a plurality of mounting brackets 18, four of which are shown in FIGURES 1 and 2. Lateral support means, such as a plurality of radially inwardly extending arms 20 are attached at their outer end to the mounting brackets 18. The lateral support means can be integrally formed with the mounting bracket 18 or they can be individual arms which are attached to the mounting brackets by any conventional means such as by bolting, welding, etc. The arms 20 extend inwardly and meet at a common disc-like member 22 which is coaxial with the axis 23 of the rocket motor 10 and exhaust nozzle 16.

Mounted on the upstream side 24 of the disc 22 and radial arms 20 is a conical plug 26 having its apex 27 coincident with the axis 23 and pointing upstream towards the throat of the exhaust nozzle 16. The plug 26 is removably mounted on the disc 22 by any conventional means such as by a bolt 28 which is received within an internally threaded bore 30 in the base 32 of the plug 26. A plurality or series of such plugs are provided, each successive plug having the slope of its side increasing as illustrated by the dotted, dashed, and solid lines 34, 36, 38, respectively, in FIGURE 1 which are illustrative of three individual plugs. As the slope of the plug side increases with respect to the nozzle axis 23 it may be desirable to provide a concavity to the contour of the plug sides to more efficiently direct the exhaust gases.

The plug 26 serves as a guide to the expanding rearwardly flowing exhaust gases emanating from the nozzle 16 and causes the exhaust gases to be deflected a predetermined amount from the normal axial flow path as is illustrated by the flow arrows 34′ 36′, and 38′, respectively. The axial component of the resultant thrust vestor decreases successively as the slope of the plug side increases successively, however, an indication of this variation in direction of the resultant thrust vector is not transmitted upstream into the nozzle throat 14 and concomitantly into the combustion chamber. Obviously, as the axial component of the resultant thrust vector decreases the lateral or radial component of the resultant thrust vector increases. Due to the symmetry of the plug and mounting arrangement each lateral or radial thrust vector will be counteracted by a diametrically opposed vector of equal magnitude thus obviating any thrust in other than an axial direction.

The particular thrust level desired during flight is preset by merely choosing the particular plug portion 26 of the exhaust nozzle 16 which will provide the axial thrust component equal to the desired axial thrust level. A set of interchangeable plugs are provided and the particular one required can be easily installed on the lateral support means by any mounting means provided such as the bolt 28. Alternatively, a series of plugs integrally formed with or fixedly mounted on the lateral support means 20 can be provided and the combination of the particular plug and lateral support means required to provide the desired thrust may be chosen and mounted on the mounting brackets 18.

A second embodiment of this invention, which is a modification of the first embodiment illustrated in FIGURES 1 and 2, is illustrated in FIGURES 3 and 4. The second embodiment involves replacing the conical plug 26 and lateral support means 20 of the first embodiment with a disc 40 which can be removably mounted on the mounting brackets 18 by any conventional means such as bolts 42. A set or series of discs is provided, each disc having a bore coaxial with the nozzle axis 23 with the bore of each successive disc having a successively decreasing diameter. This is illustrated by the dotted, dashed, and solid lines 43, 44, 45, respectively. The axial thrust level is directly proportional to the bore diameter. The exhaust gases which do not pass through the rearwardly directed bore are reflected off the disc 40 and flow laterally or radially outwardly. Due to the symmetrical arrangement of the portion of the nozzle downstream from the throat 14 the lateral component of the resultant thrust vector is equally distributed circumferentially and obviates any resultant lateral thrust.

Figure 5:
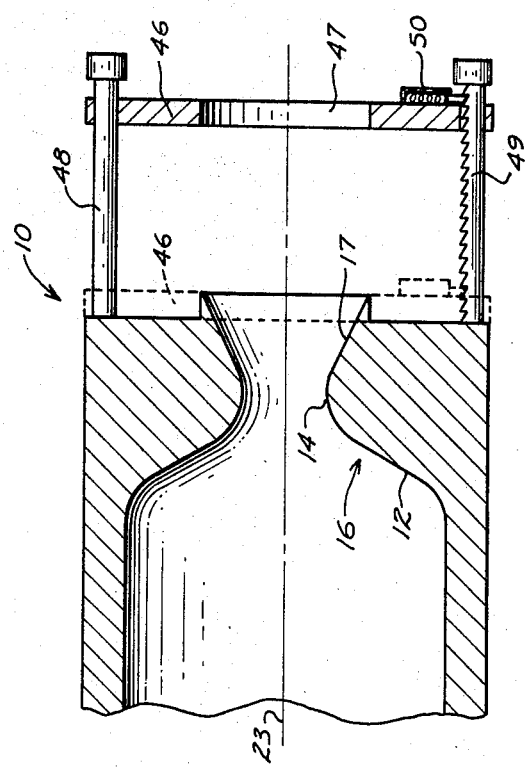
FIGURE 5 is a sectional view of a rocket nozzle employing a translatable nozzle portion.

An alternative to replacing the individual discs 40 of the second embodiment is shown in FIGURES 5 and 6 and comprises mounting a disc 46 having a bore 47 therethrough for translational movement relative to the nozzle 16. The disc 46 is supported by a plurality of mounting brackets 48 at least one of which is in the form of a ratchet bar 49. A spring-loaded pawl 50 is mounted on the disc 46 to engage the ratchet bar 49 and provide means for locking the disc in a desired position relative to the nozzle 16. The bore 47 is sized to permit the disc 46 to be placed in a non-operating position by sliding the disc over the nozzle as shown by the dotted lines in FIGURE 5.

Movement of the disc 46 towards the nozzle effects an increased axial thrust level while movement of the disc away from the nozzle effects a decreased axial thrust level due to the effective area of the bore 47 relative to the area encompassed by the exhaust gases at the location of the disc 46.

The third embodiment of the present invention, illustrated in FIGURES 7 through 9, involves providing a plurality of interchangeable exhaust nozzle portions generally shown at 52, 53, and 54 which are adapted for mounting on the exhaust end of a rocket motor 10. The mounting means 55, such as a threaded engagement between one end of the interchangeable portion 52 and the exhaust end of the rocket motor 10, provides a rapid and inexpensive means for assembling the interchangeable portion of the nozzle onto the rocket motor.

Each of the plurality of interchangeable portions 52, 53, 54, are designed so that the total effective exhaust or throat area of each of the interchangeable portions is equal to a predetermined fixed value, albeit the cross-sectional area of corresponding ports of each of the interchangeable portions is unequal in order to effect various predetermined axial thrust levels. It should be noted that due to efficiency considerations (nozzle discharge coefficient) the sum total of the actual (i.e., the dimensional) cross-sectional areas may not be constant; however, when the nozzle discharge coefficient is considered the sum total effective exhaust area is constant. More specifically, and with reference to a comparison of FIGURES 7, 8, and 9, a series of interchangeable portions 52, 53, 54, are provided with the rearwardly directed exhaust ports 56, 58, 60, of each of the portions 52, 53, 54, respectively, being successively diminished in cross-sectional area in order to provide a successively reduced axial thrust level. However, in order to maintain the total effective exhaust or throat area constant for all of the interchangeable portions a plurality of laterally or radially directed exhaust ports, ports 62 in FIGURE 8 and ports 64 in FIGURE 9, are provided. The laterally directed ports of each portion have equal cross-sectional areas but the area of the ports of one portion is larger than the area of the corresponding ports of the portion immediately preceding it in the series to correspond to the successively decreasing area of the rearwardly directed ports.

Turning now to FIGURE 7 the interchangeable portion 52 illustrated therein provides the maximum axial thrust level in the set of nozzles since the interchangeable portion merely forms the conventional converging-diverging nozzle directing the entire stream of exhaust gases rearwardly. The predetermined fixed value of the total effective exhaust area for each of the interchangeable portions of the set of nozzles is equal to the effective area of the throat 66 of the interchangeable portion 52. Having established that fixed value the designs of the remaining interchangeable portions 53, 54 are based upon having a sum total effective exhaust area equal to the effective area of the throat 66.

With reference now to FIGURE 8 there is shown a second particular interchangeable portion 53 having a rearwardly directed exhaust port 58 whose effective throat cross-sectional area is less than that of the throat 66 of the interchangeable portion 52 shown in FIGURE 7. To compensate for the reduced rearwardly directed throat area a plurality of equally circumferentially spaced, laterally or radially directed exhaust ports 62 are provided and are of such a size that the sum total of the effective exhaust area of all the laterally directed exhaust ports 62 and the rearwardly directed exhaust port 58 is equal to the effective area of the throat 66 of the first mentioned interchangeable portion 52. Referring now to FIGURE 9 there is shown a third particular interchangeable portion 54 having a rearwardly directed exhaust port 60 designed to provide the minimum axial thrust level required. Again to compensate for the reduced cross-sectional area of the rearwardly directed exhaust port 60 there is provided a plurality of laterally directed exhaust ports 64 having increased cross-sectional areas as compared with their corresponding ports 62 in the interchangeable portion 53 shown in FIGURE 8.

It can, therefore, be seen that in spite of the gradual successive reduction in the cross-sectional area of the rearwardly directed exhaust ports a successively increased size of the laterally directed exhaust ports compensate therefor and the total effective exhaust or throat area for each portion remains constant. Consequently the combustion chamber pressure is unaffected by the variation in axial thrust level.

In order to obviate any resultant lateral thrust the laterally directed exhaust ports must be equally circumferentially spaced about the nozzle so that any particular lateral thrust component will have a corresponding equal and opposite lateral thrust component.

The axial thrust level desired during flight is predetermined by merely selecting the particular interchangeable portion designed to produce that level of axial thrust. It is clear that any gradation of axial thrust level variation may be available by merely increasing the number of interchangeable portions with each particular interchangeable portion having a successively smaller rearwardly directed exhaust port area. It should be noted that similar results can be obtained by varying the number of laterally directed ports in conjunction with varying the area of the rearwardly directed port rather than varying the diameter of these ports.

While three specific embodiments have been shown and described above it will be obvious to those skilled in the art that various changes and modifications may be made without departing from the invention in its broader aspects. Therefore, it is intended that the appended claims cover all such changes and modifications as fall within the true spirit and scope of this invention.

What is claimed as new and desired to be secured by Letters Patent of the United States is:

1. In combination with a rocket motor having a combustion chamber and exhaust nozzle means, a first thrust control nozzle portion adapted to be removably mounted in a predetermined fixed position on said rocket motor downstream of the exhaust end thereof, said first portion having port means oriented to effect a first rearwardly directed axial thrust component of a predetermined magnitude in the rocket motor exhaust gases flowing therethrough when said first portion is mounted on said rocket motor, the magnitude of the sum of all the thrust components effected by said first portion being equal to a predetermined value, said first portion being replaceable by a second nozzle portion adapted to be removably mounted on said rocket motor in said predetermined position and having port means oriented to effect a second rearwardly directed axial thrust component of a different magnitude than said first axial thrust component and nonaxial thrust components in the rocket motor exhaust gases flowing therethrough when said second portion is mounted on said rocket motor, the magnitude of the sum of all thrust components effected by said second portion being equal to said predetermined value, thereby providing for preflight variance of the rocket motor axial thrust level by selection of one of said portions, whereby each of said portions effects a back pressure on said combustion chamber that is substantially the same for any given combustion chamber pressure during firing of said rocket motor.

2. The combination of claim 1 wherein each of said nozzle portions comprises a conical plug having its apex facing upstream when said portion is mounted on said rocket motor.

3. The combination of claim 2 wherein the outer side surface of said conical plug is concave.

4. The combination of claim 1 wherein each of said nozzle portions comprises a disc-like member having a rearwardly directed port, said port of said first portion and said port of said second portion being of differing cross sectional area.

5. The combination of claim 1 wherein said port means of each of said nozzle portions comprise at least one rearwardly directed exhaust port and at least one laterally directed exhaust port when the respective nozzle portion is mounted on said rocket motor.

6. The combination of claim 5 wherein said port means of each of said nozzle portions comprise a plurality of equally circumferentially spaced, laterally directed exhaust ports, said laterally directed exhaust ports serving to obviate resultant lateral thrust while reducing the axial thrust level during firing of said rocket motor.

7. The combination of claim 1 wherein said first nozzle portion has its port means solely rearwardly directed when mounted on said rocket motor, and said second nozzle portion comprises a rearwardly directed exhaust port and a laterally directed exhaust port when mounted on said rocket motor.

References Cited

UNITED STATES PATENTS

| | | | |
|---|---|---|---|
| 1,836,505 | 12/1931 | Pritchard | 239—504 X |
| 2,481,059 | 9/1949 | Africano. | |
| 2,778,685 | 1/1957 | Umbricht | 239—518 |
| 2,828,604 | 4/1958 | Hirsch et al. | 60—35.6 |
| 2,850,976 | 9/1958 | Seifert. | |
| 2,866,413 | 12/1958 | Roquemore | 237—505 X |
| 2,933,889 | 4/1960 | Tolkmitt | 60—35.54 X |
| 2,968,919 | 1/1961 | Hughes et al. | |
| 3,003,312 | 10/1961 | Jewell | 60—35.55 X |
| 3,052,091 | 9/1962 | D'Ooge. | |
| 3,069,852 | 12/1962 | Stricker | 60—35.55 |
| 3,171,602 | 3/1965 | Bauchet | 239—515 |

JULIUS E. WEST, *Primary Examiner.*